US012647485B2

(12) United States Patent
Thiem et al.

(10) Patent No.: US 12,647,485 B2
(45) Date of Patent: Jun. 2, 2026

(54) METHOD FOR OPERATING A DEVICE IN AN IOT SYSTEM

(71) Applicant: Siemens Aktiengesellschaft, Munich (DE)

(72) Inventors: Sebastian Thiem, Neustadt an der Aisch (DE); Sascha Batz, Hemhofen (DE); Stefan Niessen, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 13 days.

(21) Appl. No.: 18/706,295

(22) PCT Filed: Oct. 24, 2022

(86) PCT No.: PCT/EP2022/079643
§ 371 (c)(1),
(2) Date: Apr. 30, 2024

(87) PCT Pub. No.: WO2023/078719
PCT Pub. Date: May 11, 2023

(65) Prior Publication Data
US 2025/0007983 A1     Jan. 2, 2025

(30) Foreign Application Priority Data
Nov. 2, 2021   (EP) ..................................... 21205887

(51) Int. Cl.
*H04L 67/125*     (2022.01)
*G16Y 40/35*      (2020.01)
(52) U.S. Cl.
CPC ............ *H04L 67/125* (2013.01); *G16Y 40/35* (2020.01)

(58) Field of Classification Search
CPC ...... G05B 19/0428; G05B 2219/25428; G16Y 40/35; H04L 67/125
See application file for complete search history.

(56) References Cited

U.S. PATENT DOCUMENTS

| | | | |
|---|---|---|---|
| 2015/0046125 A1 | 2/2015 | Jagiella et al. | |
| 2017/0004421 A1* | 1/2017 | Gatson .................... | H04L 43/55 |
| 2018/0026840 A1 | 1/2018 | Toepke et al. | |
| 2020/0103844 A1 | 4/2020 | Victoriano et al. | |
| 2020/0192319 A1 | 6/2020 | Ong et al. | |
| 2021/0097392 A1* | 4/2021 | Falik ........................ | G06N 3/08 |
| 2021/0181720 A1* | 6/2021 | Ratilla ............... | G05B 19/4183 |
| 2022/0150306 A1* | 5/2022 | Kumar .................. | G16Y 40/35 |

OTHER PUBLICATIONS

European Search Report mailed Apr. 14, 2022 corresponding to European Application No. 21205887.9, filed Nov. 2, 2021.

* cited by examiner

*Primary Examiner* — Jason D Recek
(74) *Attorney, Agent, or Firm* — Schmeiser, Olsen & Watts, LLP

(57)     ABSTRACT
A method for operating a device is provided, hereinafter referred to as field device, in a system including an IoT platform. For simple connection of a further field device to an IoT platform and improved operation, provision is made for a database that stores connectivity data and further device data from field devices and that the IoT platform is able to access. To connect the further field device, a device ID of the further field device is transmitted to the IoT platform and the associated connectivity data are queried from the database. During operation, the further device data are evaluated and a signal for controlling or regulating the field device or other devices is generated.

18 Claims, 1 Drawing Sheet

METHOD FOR OPERATING A DEVICE IN AN IOT SYSTEM

CROSS-REFERENCE TO RELATED APPLICATIONS

Figures 1, 2:
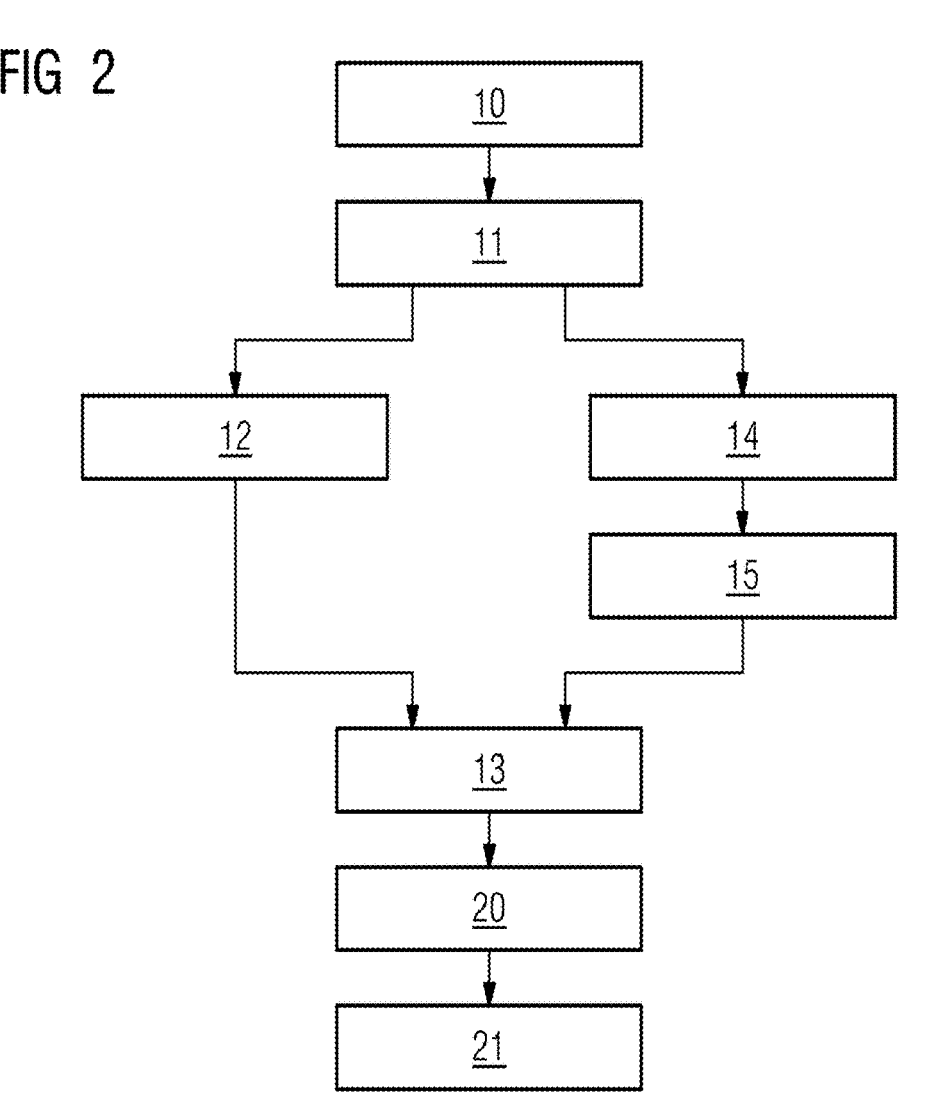

This application claims priority to PCT Application No. PCT/EP2022/079643, having a filing date of Oct. 24, 2022, which claims priority to European Application No. 21205887.9, having a filing date of Nov. 2, 2021, the entire contents both of which are hereby incorporated by reference.

FIELD OF TECHNOLOGY

The following relates to a method for operating a device, hereinafter referred to as a field device, in a system containing an IoT platform.

BACKGROUND

A wide variety of field devices today are connected to an IT infrastructure, normally referred to as a cloud, for example in order to permit control or monitoring of the field device or to read data acquired thereby for any analyses. This is accomplished using an IoT platform that, similarly to an operating system, permits access to the field device and bidirectional communication.

Operating the field device also includes starting it up, with connection of the field device to the IoT platform for the first time, also referred to as linking the field device or IoT integration.

An example of an IoT system containing at least one field device comprises an energy management system of a building or of an industrial site. The building typically contains multiple field devices combined into installations. The installations present may be heat pumps, photovoltaic installations, electric charging columns and/or rechargeable batteries, normally referred to as batteries. The energy management system can compute an optimum "schedule" for the generation of energy/supply and consumption. For this, it requires data on the installations or field devices that can be taken from a datasheet of the field device, for example the maximum charging and discharge power of the battery and its capacity. Furthermore, the energy management system requires information about the present state of the energy system, for which purpose it needs to read data acquired by the field device. Further, it needs to control the installations during operation, in order to optimize the supply of energy.

The installations or field devices thus need to be linked to the energy management system. In embodiments, further field devices are generally also linked, that is to say integrated, into an existing energy management system containing already linked field devices. Based on the present conventional art, this is complex, time-consuming and susceptible to error, as can be illustrated using the example of the battery: someone in situ needs to identify the manufacturer and type of the battery and obtain the related datasheet. They then need to use the datasheet to find out which protocol can be used to address the battery (for example Modbus, BACNet, and so on). Additionally, it is necessary to determine which registers contain which measured values or data (for example the state of charge of the battery) and in which unit/which format, and by which registers, the battery can be controlled (for example its charging or discharge power). All of these data are then typically input into an appropriate form/mask/UI on a terminal; only then is it possible to link the further field device.

When the further field device is operated after being linked, it is subject to aging processes and sources of error that can sometimes lead to failure of an entire installation.

SUMMARY

An aspect relates to simplifying the linking of a further field device to an IoT platform, to reduce susceptibility to error and to improve its further operation.

Embodiments of the invention provide for the use of a database that stores the data required for connecting a field device (hereinafter referred to as connectivity data) with a respective related device ID and that the IoT platform can access. The device ID is used to identify a field device. The database comprises device IDs and connectivity data of field devices that are linked to the IoT platform and also a device ID and connectivity data of at least one other field device, i.e., a field device that has hitherto not been linked to the IoT platform. In embodiments, the method provides for just a device ID of the further field device to be sent to the IoT platform. This is compared with the device IDs stored in the database, and a match results in the connectivity data related to the device ID being transferred to the IoT platform. In embodiments, a comparison is thus performed to ascertain whether the device ID of the further field device matches a device ID of another field device, the data of which, as described above, are stored in the database. If this is the case, the connection between the further field device and the IoT platform can be made on the basis of the transferred conductivity data of the related other field device, since the connectivity data of the other field device are applicable to the linking of the further field device. The further field device to be linked may also be of the same type as an already linked field device and may have the same device ID; in this case, comparison of the device IDs is followed by the connectivity data of the related field device being transferred and used for linking the further field device.

Further device data of the further field device are transferred—in particular in the course of further operation of the further field device or of the installation—to the IoT platform and stored in the database in association with the device ID. This permits continuous learning and expansion of the database or of the IoT platform. The further device data of the further field device and optionally further field devices connected to the IoT platform are evaluated, and the evaluation is taken as a basis for outputting a signal for controlling and/or regulating the further field device and/or other field devices or installations directly or indirectly connected to the IoT platform.

If the transferred device ID of the further field device is not present in the database, the device ID is stored in the database. Furthermore, the connectivity data are requested, for example the IoT platform sends a query to a different database or to the user of the further field device or of the installation. Following receipt and storage in the database, linking as described is possible.

If the transferred device ID of the further field device is present in the database, but no related connectivity data are present, the connectivity data are requested and stored as above.

In embodiments, the method and/or one or more functions, features and/or steps of the method according to embodiments of the invention and/or of one of its configurations may be computer-aided.

Embodiments of the present invention have the advantage that time involvement and costs for linking or for connecting the devices to the cloud can be reduced. In addition, the method according to embodiments of the invention is less susceptible to error. In embodiments, further applications, such as energy management systems, can be started up much more efficiently. In addition, the transferred/stored data are available for a data analysis, which means that further error sources and/or savings potentials can be recognized and used.

In embodiments, the method according to the invention permits devices (or edge devices) to be efficiently linked to an IoT platform, the database to be expanded with data from the field, which are returned to the database via the IoT platform that is then linked, and the data to be categorized, for example according to abstract classes easily recognizable to the engineer.

The device ID denotes not the individual field device or individual further field device, but rather the type thereof, desirably including all details relevant to its use (for example manufacturer, series, production time and suchlike). According to an embodiment, the device ID transferred is an image of the further field device or of a part of the further field device, for example a label. The device ID may also be a barcode or a QR code, or it is possible to use the product name, possibly in conjunction with the manufacturer name.

This permits identification of the further field device, in particular if the connectivity data are unknown.

According to an embodiment, the connectivity data contains information about a port, a protocol, a register and/or an abstract generic device model.

This allows the connectivity data required for linking the further field device to be determined in an improved manner.

In an embodiment, the IoT platform requests the further device data, which are in particular likewise stored. In embodiments, the IoT platform can ask an engineer/user in situ to input these further data. Following this user input, the entered data are transferred to the IoT platform. In embodiments, the IoT platform recognizes which data are missing or are particularly important for making the connection. The user is therefore not asked to input fixed or all further device data, but just to input data that are useable as above.

The device ID of the further field device can be compared with device IDs stored in the database by using an AI method/algorithm and thus a neural network. This is advantageous in particular if the device ID used is an image. The image may desirably have been captured by a smartphone. The neural network (AI) is accordingly trained on the basis of known images of known installations. In embodiments, the training can be carried out by various photographs/images of field devices from various manufacturers. This allows cross-manufacturer recognition/linking. In other words, an image of the further field device is captured, transferred to the IoT platform, and the neural network then recognizes the further field device, determines the related connectivity data and then transfers same.

The further device data transferred to the IoT platform and stored may be position data of the further field device, in particular GPS coordinates of its installation location. The position data can then be used to perform a logic combination with external position-specific data (e.g., climate or weather). In embodiments, the logic combination or the external position-specific data can be used to infer a probabilistic statement or a simulation with regard to service life or a cause of damage.

Alternatively, or additionally, the further device data transferred and stored may be operating data acquired during operation of the further field device. It is further advantageous to subsequently, desirably regularly/continually, update these operating data during operation of the further field device. This allows ongoing monitoring and/or analyses concerning the trend in parameters over time or other data analyses.

Alternatively, or additionally, a categorization of the devices whose device IDs are stored in the database can be produced. This can be accomplished by producing an abstract description of categories of devices (e.g., a heat pump, or a heat pump with a capacity-controlled compressor). This allows the initially present data and additionally data collected from the field (further device data) to be stored in a structured manner and also processed in a structured manner and made available for data-analytical further analyses. By way of example, site, weather influences and/or further parameters can be taken as a basis for analyzing the performance, aging, etc., of a field device.

BRIEF DESCRIPTION

Some of the embodiments will be described in detail, with references to the following Figures, wherein like designations denote like members, wherein:

FIG. 1 shows a schematic representation of an IoT system according to a configuration of the present invention; and FIG. 2 shows a flowchart of the method according to embodiments of the invention.

DETAILED DESCRIPTION

FIG. 1 shows an IoT system containing an IoT platform 1 and an energy management system 6, which comprises, inter alia, a battery 2 as a further field device. The battery 2 has a device ID 3 in the form of a QR code. The field device that the energy management system 6 has is a photovoltaic installation 7, which is already connected to the IoT platform and which can charge the battery 2. The IoT platform 1 can access a database 4 that stores, in each case with related connectivity data, device IDs of the PV installation and the device IDs of multiple batteries as other field devices. The database can optionally store multiple device IDs for a field device. Furthermore, there is a terminal 5 connected to the IoT platform.

In order to make the connection shown in FIG. 1 between the further field device 2 and the IoT platform 1 and thereby to link the further field device, the steps shown in FIG. 2 are carried out.

In step 10, a device ID, here the QR code 3, is input on the terminal 5, for example by virtue of an engineer uploading the image of the QR code 3 to the IoT platform via a user interface.

In step 11, the device ID 3 is sent from the IoT platform to the database 4; the latter checks whether the device ID is present and whether connectivity data related to the device ID are stored. If both are confirmed, the connectivity data, in particular the protocol used and also registers and further required parameters, are transferred to the IoT platform in step 12, and the IoT platform uses these connectivity data to make the connection to the further field device 2 (step 13). Otherwise, the user is asked to input the required connectivity data on the terminal (step 14); these data are stored in association with the device ID or, if the database does not contain the device ID, a corresponding new dataset is created and the device ID is stored (step 15). In each of these cases, the connection to the further field device is then made (step 13).

After the connection has been made, the battery 2 transfers further device data to the IoT platform (step 20), for example its present state of charge. Similarly, the photovoltaic installation transfers further device data, for example characteristics such as its site and/or operating data such as its present output. The further device data are evaluated and a signal inferred therefrom is generated (step 21) that can be used to control and/or regulate the battery or any field device that is directly or indirectly connected to the IoT platform. Furthermore, the further device data are stored in the database.

In the example described, the aging of the battery or its efficiency can be determined over a specific period from transferred operating data (for example the required charging time or the capacity reached). This evaluation of the operating data can be used by the PV installation for controlling the charging process, or a signal can be output that indicates maintenance measures or the need to change the battery on account of the aging phenomena.

The operating data: temperature and output of the PV installation can be used for example to determine the temperature dependency of the efficiency of the solar cells. The position data can be used to determine future weather conditions and therefore the expected performance. Such an evaluation permits control of the charging process of the battery and/or control of loads in the energy management system.

The transfer of further device data to the IoT platform, which data are stored in the database, allows a multiplicity of different evaluations. By way of example, a desired evaluation that can be calculated is a probabilistic distribution pertaining to the coefficient of performance (COP) or a different parameter of a heat pump of a specific manufacturer and of a specific type. This information can be delivered to further applications, e.g., to an energy management system or a different system for production optimization, in order to use an initial configuration or parameterization to permit improved control of the system.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating a further field device in a system comprising an IoT platform that has access to a database, the method comprising:

i. transferring a device ID of the further field device to the IoT platform, wherein the database stores multiple device IDs and connectivity data specific to each device ID of the multiple device IDs, wherein each device ID of the multiple device IDs is a device ID of a field device of a plurality of field devices, and wherein the device ID of each individual field device of the further field device and of each field device of the plurality of field devices does not uniquely identify each individual field device, and wherein the device ID of each individual field device is specific to a device type;

ii. comparing the device ID of the further field device with the multiple device IDs that are stored in the database;

iii. in response to a match from said comparing between the device ID of the further field device and one device ID of the multiple device IDs stored in the database wherein the one device ID is a device ID of one field device of the plurality of field devices: transferring the connectivity data related to the device ID of the further field device to the IoT platform;

making a connection between the further field device and the IoT platform by using the transferred connectivity data;

transferring further device data of the further field device to the IoT platform and storing the further device data of the further field device in association with the one field device of the plurality of field devices;

evaluating the further device data of the further field device and/or of other devices connected to the IoT platform; and outputting a signal, which is based on the evaluation, for operating the further field device and/or other devices directly or indirectly connected to the IoT platform.

2. The method as claimed in claim 1, wherein the connectivity data contain information about a port, a protocol, a register and/or an abstract generic device model.

3. The method as claimed in claim 1, wherein subsequent to step ii) the connectivity data pertaining to the device ID of the further field device are requested by the IoT platform if they are not stored in the database, and the received connectivity data and optionally the device ID are stored in the database.

4. The method as claimed in claim 1, wherein the IoT platform requests the further device data via a connected terminal.

5. The method as claimed in claim 1, wherein a neural network is used for comparing the device ID of the further field device with device IDs stored in the database.

6. The method as claimed in claim 1, wherein the device ID transferred is an image of the further field device or of a part of the further field device.

7. The method as claimed in claim 1, wherein the further device data stored are position data of the further field device, wherein the position data are GPS coordinates of its installation location.

8. The method as claimed in claim 7, wherein the position data are used to perform a logic combination with external position-specific data.

9. The method as claimed in claim 8, wherein the logic combination or the external position-specific data are used to infer a probabilistic statement/simulation with regard to service life or a cause of damage.

10. The method as claimed in claim 1, wherein the further device data stored are operating data acquired during operation of the field device.

11. The method as claimed in claim 10, wherein the operating data are regularly/continually updated during operation of the further field device.

12. The method as claimed in claim 1, wherein a categorization of the field devices whose device IDs are stored in the database is produced.

13. A system for carrying out the method as claimed in claim 1, said system comprising:

an IoT platform that has access to the database, and the further field device.

14. The method as claimed in claim 1, wherein the device ID of each individual field device includes details relevant to a use of each individual field device.

15. The method as claimed in claim 14, wherein the details relevant to the use of each individual field device denoted by the device ID of each individual field device includes a manufacturer, series, and production time of each individual field device.

16. The method as claimed in claim 1, wherein at least two device IDs of the multiple IDs stored in the database are device IDs of a single field device.

17. The method as claimed in claim 1, wherein said transferring the further device data to the IoT platform comprises transferring the connectivity data of the one field device to the IoT platform.

18. The method as claimed in claim 1, wherein the plurality of field devices comprise at one or more field devices linked to the IoT platform and one or more other field devices hitherto not linked to the IoT platform.

* * * * *